(12) United States Patent
Bondalapati et al.

(10) Patent No.: US 8,707,063 B2
(45) Date of Patent: Apr. 22, 2014

(54) HARDWARE ASSISTED PERFORMANCE STATE MANAGEMENT BASED ON PROCESSOR STATE CHANGES

(75) Inventors: Kiran Bondalapati, Los Altos, CA (US); Magiting M. Talisayon, Newton, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 401 days.

(21) Appl. No.: 12/974,162

(22) Filed: Dec. 21, 2010

(65) Prior Publication Data

US 2012/0159224 A1    Jun. 21, 2012

(51) Int. Cl.
*G06F 1/32* (2006.01)

(52) U.S. Cl.
USPC ............................ 713/300; 713/320; 713/323

(58) Field of Classification Search
USPC .......................................... 713/300, 320, 323
See application file for complete search history.

(56) References Cited

U.S. PATENT DOCUMENTS

| | | | | |
|---|---|---|---|---|
| 6,442,700 B1* | 8/2002 | Cooper | ......................... | 713/320 |
| 7,747,881 B2* | 6/2010 | Duran et al. | .................. | 713/300 |
| 8,239,697 B2* | 8/2012 | Verdun | ........................ | 713/300 |
| 2008/0040622 A1* | 2/2008 | Duran et al. | .................. | 713/300 |
| 2009/0259869 A1* | 10/2009 | Naffziger | ....................... | 713/340 |
| 2011/0078478 A1* | 3/2011 | Branover et al. | ............. | 713/323 |
| 2011/0107115 A1* | 5/2011 | Verdun | ........................ | 713/300 |
| 2012/0159123 A1* | 6/2012 | Naffziger et al. | .............. | 712/37 |
| 2012/0159198 A1* | 6/2012 | Naffziger et al. | ............. | 713/300 |

* cited by examiner

*Primary Examiner* — M Elamin
(74) *Attorney, Agent, or Firm* — Volpe and Koenig, P.C.

(57) ABSTRACT

A processor is configured to support a plurality of performance states and idle states. The processor includes a first programmable location associated with a first idle state and configured to store first entry performance state (P-State) information. The first entry P-State information identifies a first entry P-State. The processor is configured to receive a request to enter the first idle state, retrieve the first entry P-State information and enter the first entry P-State. The processor may include a second programmable location associated with the first idle state and configured to store first exit P-State information. The first exit P-State information identifies a first exit P-State. The processor may be configured to receive a request to exit the first idle state, retrieve the first exit P-State information and enter the first exit P-State.

31 Claims, 4 Drawing Sheets

HARDWARE ASSISTED PERFORMANCE STATE MANAGEMENT BASED ON PROCESSOR STATE CHANGES

FIELD OF INVENTION

This invention relates to processor power control apparatus and methods and in particular relates to apparatus and methods to manage processor performance states.

BACKGROUND

The Advanced Configuration and Power Interface (ACPI) specification provides a standard for operating system-centric device configuration and power management. The ACPI specification defines various "states" as levels of power usage and/or features availability. ACPI states include: global states (e.g., G0-G3), device states (e.g., D0-D3), processor states (e.g., C0-C3) and performance states (e.g., P0-Pn). The operating system and/or a user may select a desired processor state and a desired performance state in an effort to save power. However, there is no linkage between processor states and performance states. Under some conditions, there are often marginal power savings since a high performance state will require a high processor frequency and core voltage despite a request to enter an idle processor state.

SUMMARY OF EMBODIMENTS OF THE INVENTION

A processor is configured to support a plurality of performance states and idle states. The processor includes a first programmable location associated with a first idle state and configured to store first entry performance state (P-State) information. The first entry P-State information identifies a first entry P-State. The processor is configured to receive a request to enter the first idle state, retrieve the first entry P-State information and enter the first entry P-State. The processor may include a second programmable location associated with the first idle state and configured to store first exit P-State information. The first exit P-State information identifies a first exit P-State. The processor may be configured to receive a request to exit the first idle state, retrieve the first exit P-State information and enter the first exit P-State.

DETAILED DESCRIPTION OF THE EMBODIMENTS

Figure 1:
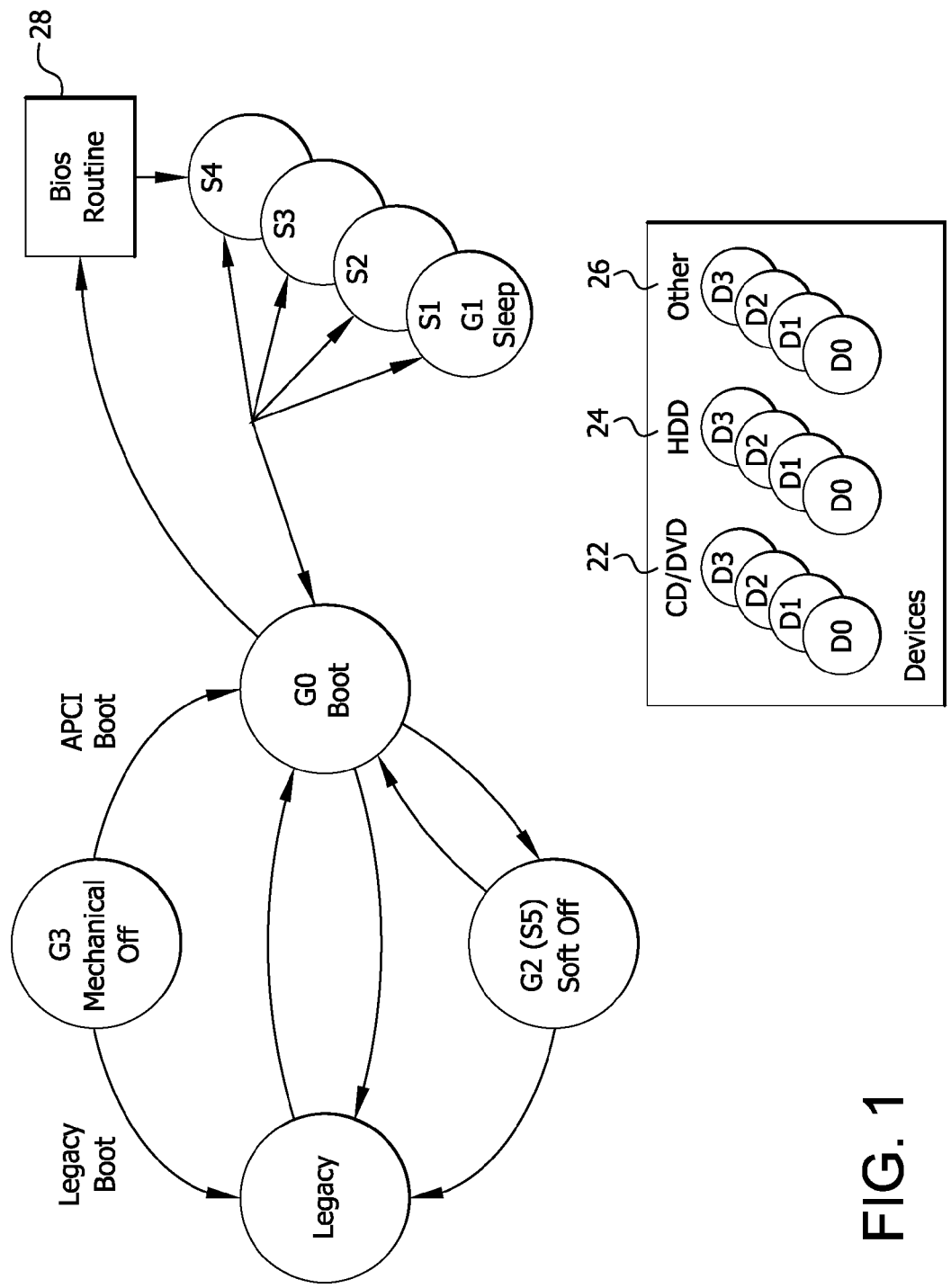
FIG. 1 is a diagram illustrating a variety of Advanced Configuration and Power Interface (ACPI) states.

FIG. 1 shows a diagram illustrating a variety of Advanced Configuration and Power Interface (ACPI) states. It should be understood that the techniques disclosed herein may also be applied to other power state standards or configurations. ACPI global states generally divide power usage and system response into a plurality states including global states or "G-States" (e.g., G0-G3) as shown in Table 1 below.

TABLE 1

| Global State | Description |
| --- | --- |
| Legacy | Prior to booting ACPI enabled operating system |
| G0 (S0) | Working |
| G1 (S1-S4) | Sleep |
| G2 (S5) | Soft Off |
| G3 | Mechanical Off |

Global state G1 is further subdivided into several sleep states, with its own hierarchy of response and power savings. For example S3 is commonly referred to as suspend to RAM and S4 is commonly referred to as suspend to disk. As shown in FIG. 1, the system may switch from one global state to another. Typically, a system is in Legacy state prior to booting an ACPI enabled operating system. Once an ACPI enable operating system is booted, the system enters the G0 state. The operating system or the user may initiate a transition into the G1 (sleep) and G2 (soft off) states via a Bios routine as shown by block 28. The G3 state is defined as mechanical off, i.e., the power cord may be removed.

A plurality of device states or "D-States" (e.g., D0-D3) are also provided. A device state may be associated with a plurality of devices, i.e., each device has its own associated device state. In this example, a CD/DVD drive 22, hard disk drive 24 and generic "other" device 26 are shown. Device states are generally defined as shown in Table 2 below:

TABLE 2

| Device State | Description |
| --- | --- |
| D0 | Operating |
| D1 | Intermediate state - varies by device |
| D2 | Intermediate state - varies by device |
| D3 | Off | processor states or "C-States" are defined as shown in Table 3 below:

TABLE 3

| processor State | Description |
| --- | --- |
| C0 | Operating |
| C1 | Halt |
| C2 | Stop-Clock |
| C3 | Sleep |
| ... | |
| Cn | Nth C-State |

It should be understood that for multiple core processors, each core may have an associated C-State. During normal operation, a processor core is in the operating state "C0" and the processor core processes instructions normally. The lower C-States (C1, C2 . . . Cn) are referred to as "idle states." System performance may depend on the selected performance state as discussed below. A system in the C1 state (Halt) does not execute instructions, but may return to an executing state essentially instantaneously. The C1 state has the lowest latency. The hardware latency in this state is low enough that the operating system does not consider the latency aspect of the state when deciding whether to use it.

In the C2 state (Stop-Clock) the processor core is not executing instructions, but will typically take longer to wake up compared to the C1 state. The C2 state offers improved power savings over the C1 state. The worst-case hardware latency for this state is provided via the ACPI system firmware and the operating system may use this information to determine when the C1 state should be used instead of the C2 state. In the C3 state (Sleep), the processor core does not need to keep its cache coherent, but maintains other state information. The C3 state offers improved power savings over the C1 and C2 states. The worst-case hardware latency for this state is provided via the ACPI system firmware and the operating system may use this information to determine when the C2 state should be used instead of the C3 state. While in the C3 state, the processor's caches maintain state but ignore any snoops. The operating system is responsible for ensuring that the caches maintain coherency. It should be understood that additional C-States may be defined without departing from the scope of this disclosure.

A plurality of performance states or "P-States" are defined as shown in Table 4 below:

TABLE 4

| Performance State | Description |
|---|---|
| P0 | Maximum Power (Pmax) |
| P1 | Intermediate Performance P0 > P1 |
| P2 | Intermediate Performance P1 > P2 |
| P3 | Intermediate Performance P2 > P3 |
| P4 | Intermediate Performance P3 > P4 |
| P5 | Intermediate Performance P4 > P5 |
| P6 | Intermediate Performance P5 > P6 |
| ... | |
| Pn | Lowest Performance (Pmin) P(n − 1) > Pn |

While a given processor core operates in the C0 state, it may be in one of several performance states P0-Pn. It should be understood that each processor core may have its own clock source and core voltage source. In the alternative, some processor cores may share a common clock source and/or core voltage source. Performance states are implementation-dependent. P0 is the highest-performance state. P1-Pn are successively lower-performance states. Typically n is no greater than 16. Each P-state is associated with a processor core operating frequency and core voltage, e.g., $V_{core}$.

In most cases, the various states discussed above are controlled by the operating system. With respect to P-States, the operating system typically runs a scheduling routine. Over time, the operating system tracks performance level as well as the desired or required performance level for each processor core. The current performance level is periodically compared to the desired level. For example, an operating system may run a performance state scheduler every 100 ms. The performance state may be adjusted as needed based on the results of the comparison.

With respect to C-States, the operating system may use a task scheduler to determine whether there are tasks that require execution. If tasks are present, the operating state (C0) is selected, or remains selected. If no tasks are present, an idle state is selected. In some cases, an idle state may be selected following user input, e.g., terminating an application.

The operating system may maintain a set of entry and exit times for each idle state as shown in Table 5 below:

TABLE 5

| C-State | Entry Time | Exit Time |
|---|---|---|
| C1 | $T_{c1e}$ | $T_{c1ex}$ |
| C2 | $T_{c2e}$ | $T_{c2ex}$ |
| C3 | $T_{c3e}$ | $T_{c3ex}$ |
| ... | | |
| Cn | $T_{cne}$ | $T_{cnex}$ |

The operating system may use the entry and exit times to determine which idle state is appropriate. For example, if only a minimal wakeup-up delay is required then C1 is selected. In the alternative, if a longer delay may be tolerated, one of the lower C-States may be selected.

From the operating system's perspective, there is no logical relationship between C-States and P-States. This may limit power savings. Assume for example, that a given processor core is operating in the P0 state, (highest performance). Also assume that the task scheduler determines that no tasks require execution on the processor core and the operating system selects a C2 state. Under these conditions, the P state dictates that processor core use the highest frequency and core voltage. Even though an idle state is selected, power savings are limited since due to the high clock rate and core voltage.

Figure 2:
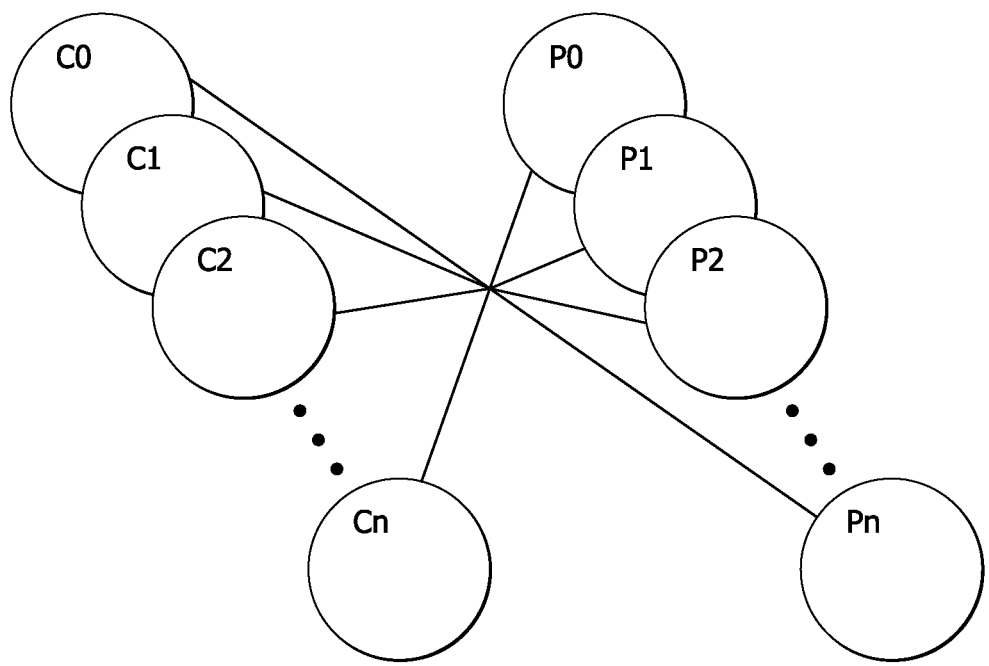
FIG. 2 is a block diagram showing the linkage between the various C-States and P-States.

In order to address this problem, the processor core may override the operating system and use a P-State that yields increased power savings without unduly effecting latency. FIG. 2 is a block diagram showing the linkage between the various C-States and P-States. In a typical scenario, the operating system will request a transition to an idle state for a given processor core. If the original P-State, e.g., as selected by the operating system, is higher than needed, the processor core may override the original P-State and use a lower P-State. When the operating system requests a pop-up, the processor core may enter the C0 state and restore the original P-State. Such P-State overrides are carried out independently by the processor core, the operating system remains unaware of any P-State overrides.

Each processor core generally has known idle state entry times and exit times. These entry and exit times will generally meet or exceed the values in Table 5 above. In order to maximize power savings, the optimal entry and exit P-State for each idle state may be measured, e.g., via actual measurements or simulations. For example, the entry times for each idle state may be tested for all possible P-States. Similarly, the exit times for each idle state may be tested for all possible P-States. Using this timing information, the optimal P-State upon entry and exit of each idle state may be selected to meet or exceed the timing requirements in Table 5 above and also yield the highest power savings. The optimal entry and exit P-states may then be stored in association with each idle state.

Each processor core may maintain a programmable location for the optimal entry and exit P-State for each idle state as shown in Table 6 below:

TABLE 6

| C-State | Entry P-State | Exit P-State |
|---|---|---|
| C1 | $P_{c1e}$ | $P_{c1ex}$ |
| C2 | $P_{c2e}$ | $P_{c2ex}$ |
| C3 | $P_{c3e}$ | $P_{c3ex}$ |
| ... | | |
| Cn | $P_{cne}$ | $P_{cnex}$ |

Figure 3:
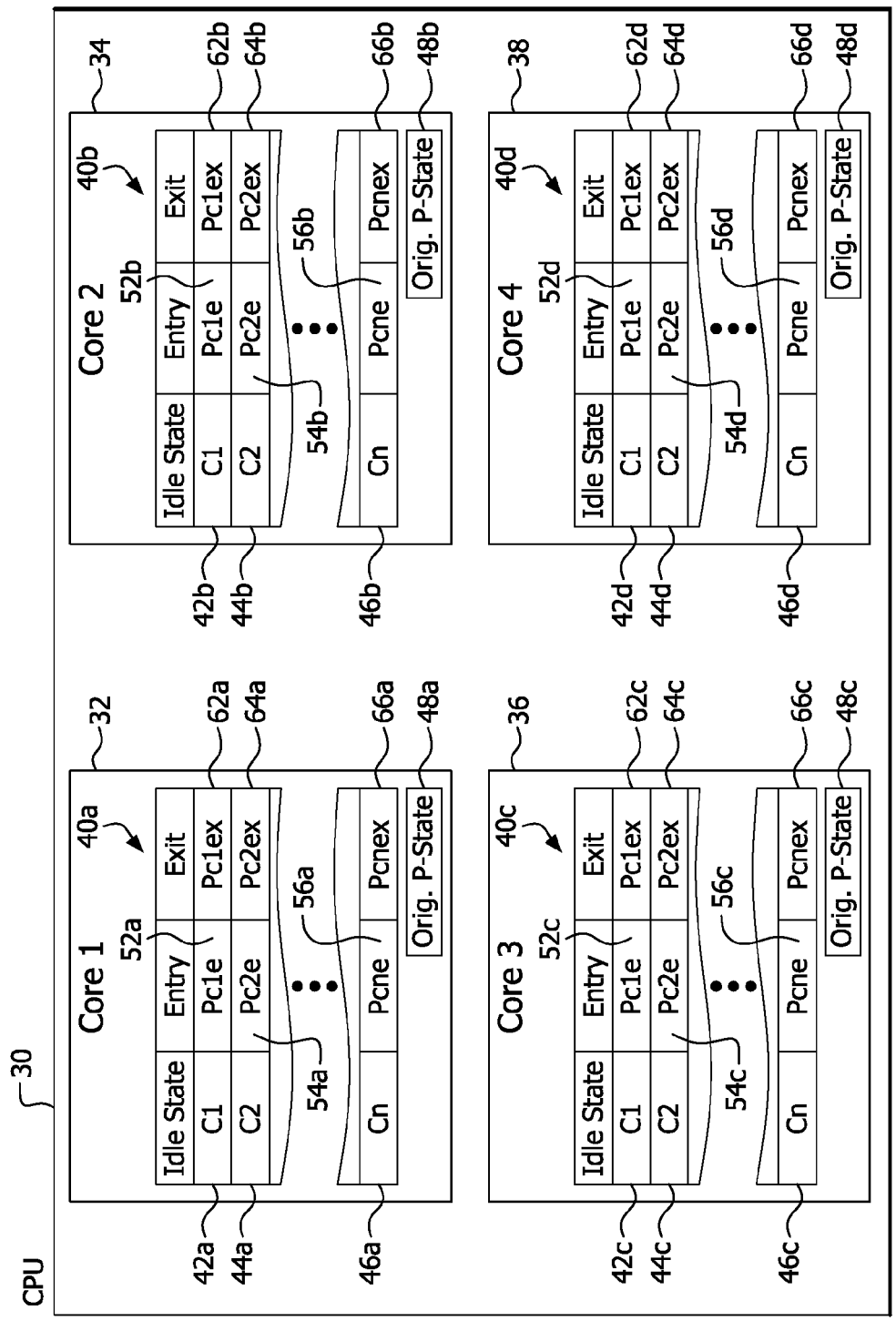
FIG. 3 is a block diagram of an example multi-core processor with a plurality of programmable storage locations for performance state management.

FIG. 3 shows an example multi-core processor 30. In this example, four cores 32, 34, 36 and 38 are shown. It should be understood that a single core processor or a multi-core processor with any number of cores may be used without departing from the scope of this disclosure. Each processor core 32, 34, 36 and 38 may have a bank of programmable locations 40a, 40b, 40c, 40d that contain the relationship between the various idle states 42a-46a, 42b-46b, 42c-46c and 42d-46d and their associated entry and exit P-States. Each bank of programmable locations 40a, 40b, 40c, 40d may be generally static or may be updated as needed. For example, the Bios may be configured to update the values in each bank of programmable locations 40a, 40b, 40c, 40d based on specific operating conditions (e.g., desktop, laptop, client, server . . . )

In this example, each processor core 32, 34, 36, 38 has a programmable location for the entry P-State 52a, 52b, 52c, 52d to be used for entry into the C1 state and for the exit P-State 62a, 62b, 62c, 62d to be used for exit from the C1 state. It should be understood that a processor core may be implemented with programmable locations for entry P-States only or exit P-States only. It should also be understood that any number of C-States may be supported.

Continuing with this example, each processor core also has programmable location for the entry P-State 54a, 54b, 54c, 54d to be used for entry into the C2 state and for the exit P-State 64a, 64b, 64c, 64d to be used exit from the C1 state. It should be understood that a large number of C-States may be supported. Accordingly, FIG. 3 also shows programmable locations for entry P-State 56a, 56b, 56c, 56d to be used for entry into the Cn state and for exit P-States 66a, 66b, 66c, 66d to be used exit from the Cn state. Each processor 32, 32, 38, 38 may also include a programmable location 48a, 48b, 48c, 48d for storage of the original P-State so that processor core 32, 34, 36 and 38 may restore the original P-State selected by the operating system upon pop-up to the C0 state.

Figure 4:
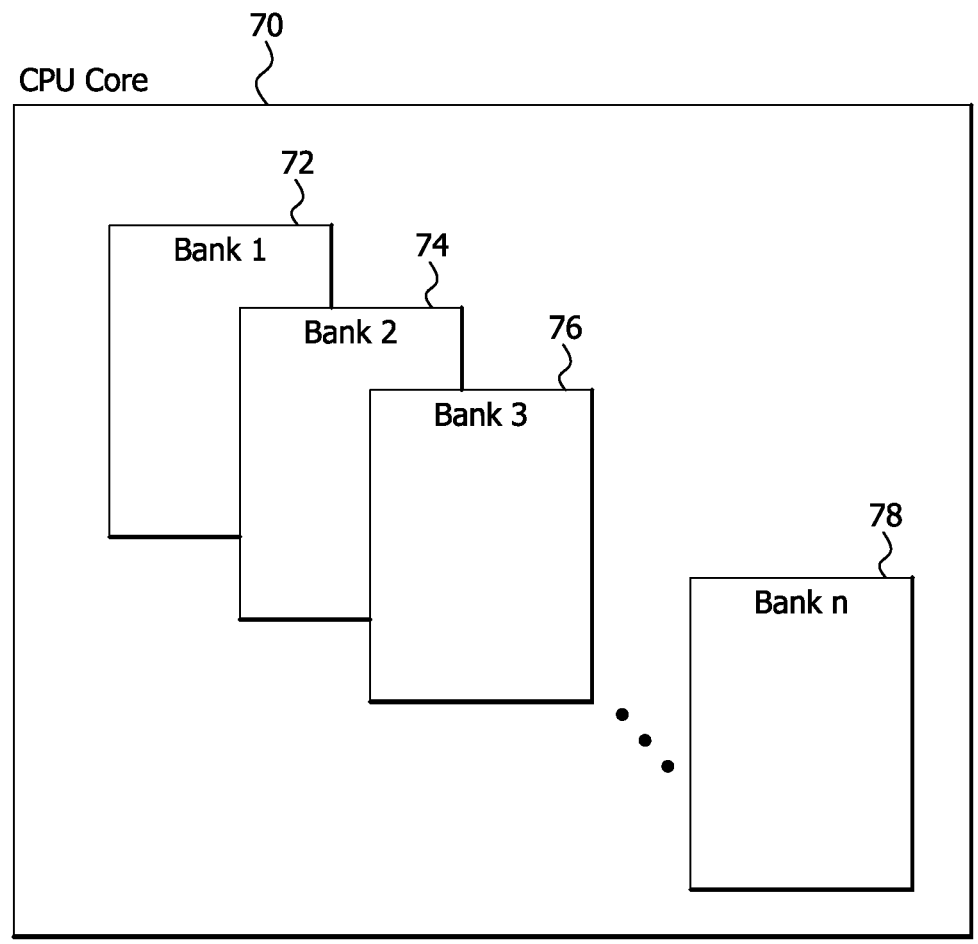
FIG. 4 is a block diagram of a processor with multiple banks of programmable locations.

FIG. 4 shows an example in which a processor core may optionally support multiple banks of programmable locations. Each bank may include one or more programmable locations. In this example, the processor core 70 includes a plurality of banks 72, 74, 76, 78 each configured to store the relationship between the various idle states and their associated entry and exit P-States. Each bank may be associated with a specific power profile. For example, Bank 1 (72) may be associated an AC power profile. Bank 2 (74) may be associated with a first battery powered profile. Bank 3 (76) may be associated with a second battery powered profile. It should be understood that a large number of banks may be provided. Bank n (78) may be associated with yet another power profile. It should be understood that power profiles need not be associated with a power source type. For example, a given power profile may be associated with a device type or usage type (e.g., desktop, laptop, server . . . ). Each bank may have a unique set of values for entry and exit P-States for each supported idle state.

It should be understood that many variations are possible based on the disclosure herein. Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

What is claimed is:

1. A processor configured to support a plurality of performance states and idle states, the processor comprising:
   a first programmable location associated with a first idle state and configured to store first entry performance state (P-State) information, the first entry P-State information identifying a first entry P-State;
   the processor being configured to retrieve the first entry P-State information and enter the first entry P-State responsive to a request to enter the first idle state.

2. The processor of claim 1 wherein the processor includes a plurality of processor cores.

3. The processor of claim 1 further comprising:
   a second programmable location associated with the first idle state and configured to store first exit P-State information, the first exit P-State information identifying a first exit P-State;
   the processor being configured to retrieve the first exit P-State information and enter the first exit P-State responsive to a request to exit the first idle state.

4. The processor of claim 1 further comprising:
   a third programmable location configured to store original P-State information, the original P-State information identifying an original operating system selected P-State;
   the processor being configured to exit the first idle state and enter the original P-State responsive to a request to exit the first idle state.

5. The processor of claim 3 wherein the first entry P-State overrides the original P-State.

6. The processor of claim 1 further comprising:
   a fourth programmable location associated with a second idle state and configured to store second entry P-State information; the second entry P-State information identifying a second entry P-State;
   the processor being configured to enter the second entry P-State responsive to a request to enter the second idle state responsive to a request to enter the second idle state.

7. The processor of claim 5 further comprising:
   a fifth programmable location associated with the second idle state and configured to store second exit P-State information; the second exit P-State information identifying a second exit P-State;
   the processor being configured to receive a request to exit the second idle state, retrieve the second exit P-State information and exit the second exit P-State.

8. The processor of claim 1 further comprising:
a first bank of programmable locations configured to store entry P-State information associated with a first profile and a second bank of programmable locations configured to store entry P-State information associated with second profile.

9. The processor of claim 6 wherein the first programmable bank is associated with an alternating current (AC) power profile and the second bank is associated with a battery power profile.

10. The processor of claim 6 wherein the at least one of the first and second bank is associated with a device type or usage type.

11. The processor of claim 9 wherein the device type identifies at least one of a client or server device.

12. A method performed by a processor configured for supporting a plurality of performance states and idle states in the processor, the method comprising:
storing first entry performance state (P-State) information in a first programmable location associated with a first idle state; the first entry P-State information identifying a first entry P-State; and
retrieving the first entry P-State information and entering the first entry P-State responsive to receiving a request to enter the first idle state.

13. The method of claim 12 further comprising:
storing first exit P-State information in a second programmable location associated with the first idle state; the first exit P-State information identifying a first exit P-State; and
retrieving the first exit P-State information and entering the first exit P-State responsive to receiving a request to exit the first idle state.

14. The method of claim 12 further comprising:
storing original P-State information in a third programmable location, the original P-State information identifying an original operating system selected P-State; and
exiting the first idle state and entering the original P-State responsive to a request to exit the first idle state.

15. The method of claim 12 wherein the first entry P-State overrides the original P-State.

16. The method of claim 12 further comprising:
storing second entry P-State information in a fourth programmable location associated with a second idle state; the second entry P-State information identifying a second entry P-State;
receiving a request to enter the second idle state, retrieving the second entry P-State information and entering the second entry P-State.

17. The method of claim 16 further comprising:
storing second exit P-State information in a fifth programmable location associated with the second idle state; the second exit P-State information identifying a second exit P-State;
retrieving the second exit P-State information and entering the second exit P-State responsive to receiving a request to exit the second idle state.

18. The method of claim 12 further comprising:
providing a first bank of programmable locations configured to store entry P-State information associated with a first profile and providing a second bank of programmable locations configured to store entry P-State information associated with second profile.

19. The method of claim 18 wherein the first programmable bank is associated with an alternating current (AC) power profile and the second bank is associated with a battery power profile.

20. The method of claim 18 wherein the at least one of the first and second bank is associated with a device type or usage type.

21. The method of claim 18 wherein the device type identifies at least one of a client or server device.

22. A non-transitory computer readable media including hardware design code stored thereon, and when processed generates other intermediary data to create mask works for a processor that is configured to perform a method of supporting a plurality of performance states and idle states, the method comprising:
storing first entry performance state (P-State) information in a first programmable location associated with a first idle state; the first entry P-State information identifying a first entry P-State; and
retrieving the first entry P-State information and entering the first entry P-State responsive to receiving a request to exit the second idle state.

23. The non-transitory computer readable media of claim 22, wherein the method further comprises:
storing first exit P-State information in a second programmable location associated with the first idle state; the first exit P-State information identifying a first exit P-State; and
retrieving the first exit P-State information and entering the first exit P-State responsive to receiving a request to exit the first idle state.

24. The non-transitory computer readable media of claim 22, wherein the method further comprises:
storing original P-State information in a third programmable location, the original P-State information identifying an original operating system selected P-State; and
exiting the first idle state and entering the original P-State responsive to a request to exit the first idle state.

25. The non-transitory computer readable media of claim 22 wherein the first entry P-State overrides the original P-State.

26. The non-transitory computer readable media of claim 22, wherein the method further comprises:
storing second entry P-State information in a fourth programmable location associated with a second idle state; the second entry P-State information identifying a second entry P-State;
receiving a request to enter the second idle state, retrieving the second entry P-State information and entering the second entry P-State.

27. The non-transitory computer readable media of claim 26, wherein the method further comprises:
storing second exit P-State information in a fifth programmable location associated with the second idle state; the second exit P-State information identifying a second exit P-State;
retrieving the second exit P-State information and entering the second exit P-State responsive to receiving a request to exit the second idle state.

28. The non-transitory computer readable media of claim 22, wherein the method further comprises:
providing a first bank of programmable locations configured to store entry P-State information associated with a first profile and providing a second bank of programmable locations configured to store entry P-State information associated with second profile.

29. The non-transitory computer readable media of claim 28 wherein the first programmable bank is associated with an alternating current (AC) power profile and the second bank is associated with a battery power profile.

30. The non-transitory computer readable media of claim 28 wherein the at least one of the first and second bank is associated with a device type or usage type.

31. The non-transitory computer readable media of claim 28 wherein the device type identifies at least one of a client or server device.

* * * * *